United States Patent [19]

Cox

[11] Patent Number: 5,501,327
[45] Date of Patent: Mar. 26, 1996

[54] COMPACT DICS HOLDER

[76] Inventor: D. Sherman Cox, 4 Chipper Rd., St. Louis, Mo. 63131

[21] Appl. No.: 317,123

[22] Filed: Oct. 3, 1994

Related U.S. Application Data

[63] Continuation-in-part of Ser. No. 71,258, Jun. 4, 1993, Pat. No. 5,351,824.

[51] Int. Cl.⁶ ................................................. B65D 85/30
[52] U.S. Cl. ...................... 206/308.1; 206/461; 206/471; 206/45.34; 206/807
[58] Field of Search ........................... 206/308.1, 309, 206/387.1, 461, 471, 45.34, 807

[56] References Cited

U.S. PATENT DOCUMENTS

| | | | |
|---|---|---|---|
| 3,550,769 | 12/1970 | Wolk | 206/78 |
| 4,381,836 | 5/1983 | Rivkin et al. | 206/387 |
| 4,383,607 | 5/1983 | Lordahl et al. | 206/45.34 |
| 4,558,782 | 12/1985 | Iverson et al. | 206/387 |
| 4,572,369 | 2/1986 | Morris | 206/387 |
| 4,760,914 | 8/1988 | Gelardi et al. | 206/387 |
| 4,771,888 | 9/1988 | Lundeen | 206/387 |
| 4,834,236 | 5/1989 | Buelens et al. | 242/71.1 |
| 4,834,238 | 5/1989 | Hehn et al. | 206/387 |
| 4,865,190 | 9/1989 | Gregerson et al. | 206/309 |
| 4,871,065 | 10/1989 | Hehn et al. | 206/309 |
| 4,881,645 | 11/1989 | Smiler et al. | 206/387 |
| 5,215,189 | 1/1993 | Weisburn et al. | 206/387 |
| 5,351,824 | 10/1994 | Cox | 206/807 |

*Primary Examiner*—Paul T. Sewell
*Assistant Examiner*—Marie Denise Patterson
*Attorney, Agent, or Firm*—Grace J. Fishel

[57] ABSTRACT

A compact disc holder for a conventional jewel box has a unitary body and a closure plate. The unitary body has a chamber with a planar top for the jewel box and an attached tab. The tab has a ridge which rises out of the plane of the tab and is angled towards the planar top of the chamber. The ridged tab renders the compact disc holder resistant to folding and facilitates proper placement of the compact disc holder in a display box.

8 Claims, 2 Drawing Sheets

COMPACT DICS HOLDER

This application is a continuation-in-part of U.S. application Ser. No. 08/071,258, filed Jun. 4, 1993, for Cassette Box Holder, to issue as U.S. Pat. No. 5,351,824 on Oct. 4, 1994.

BACKGROUND OF THE INVENTION

1. Field of the Invention

The present invention relates to an inexpensive compact disc holder which renders a compact disc less susceptible to theft at point of sale and which furthers proper placement in a display box.

2. Brief Description of the Prior Art

Compact discs are typically packaged in a hinged storage box, commonly called a "jewel box", having dimensions very similar to the disc and in which the disc is stored after purchase. A booklet is conventionally included with each compact disc. The front cover of the booklet has the album cover graphics and the inside contains the liner notes. The booklet is held behind tabs inside the front cover of the jewel box such that the front cover of the booklet is visible through the storage box. A wrapper, commonly called a "J-card", with the program listing is also typically provided, visible through the rear cover of the jewel box. The wrapper is sandwiched between the rear cover and a disc holder which is snapped into the rear section of the jewel box. Usually the wrapper extends around the ends of the disc holder to form panels that are imprinted with the title of the album and the name of the artist such that this information can be read through the spine of the storage box.

Compact discs are expensive as compared to cassette tapes and, because of their size and value, are particularly prey to theft. Outer packaging has been developed to foil theft but none is entirely satisfactory. For example, one type of retail container is made of paperboard with graphics printed directly thereon. The jewel box and the booklet are inserted into the paperboard container which is then sealed. This kind of container is relatively expensive because of the custom graphics and is easily opened in a retail outlet. Due to its opaque construction, pilferage of a disc is not easy to discover.

Another commonly used retail container for compact discs is a blister pack which contains the jewel box and the booklet and is formed of a relatively sturdy transparent plastic. Such blister packs are difficult to open by the customer and do not display the title of the album and name of the artist for easy viewing from an edge of the package. Sometimes the customer puts the blister pack back into the display bin, right side up and face forward, and sometimes not.

The outer packaging adds no value to the customer or to the retail merchant other than to reduce theft. From the customer's standpoint, an ideal package would be easy to open after purchase but from the merchant's standpoint difficult to open in a store without being detected. Minimizing packaging costs, while not interfering with the display of the merchandise, is also important from the retailer's standpoint. In addition, it would be an advance if the packaging motivated a shopper to put the merchandise back in a display with the title of the album and name of the artist right side up and facing the next customer. It would be a further benefit, if similar packaging was available for compact discs and for cassette tapes such that discs and cassettes could be sold from a display case with a plurality of similar-sized pigeon holes. More compact discs (and cassettes) would be sold if there was packaging which met the above mentioned goals.

SUMMARY OF THE INVENTION

In view of the above, it is an object of the present invention to provide an inexpensive compact disc holder that is larger than a disc and resistant to folding such that a disc stored in the holder is less susceptible to theft. It is another object to provide a compact disc holder that allows a shopper to read one of the end panels of the jewel box as it sits in a display. A further object is to provide a compact disc holder that furthers proper placement of the holder in a display box such that one of the end panels is visible. Other objects and features of the invention will be in part apparent and in part pointed out hereinafter.

In accordance with the invention, a compact disc holder for holding a jewel box containing a compact disc or some other recording media has a unitary body and a closure plate. The body has a longitudinal axis, a top surface and a bottom surface. There is a generally rectangular chamber for a jewel box formed in the body with a substantially planar top wall joined at its edges by side and end walls. The chamber side and end walls open on the bottom surface of the body. A substantially planar tab is formed in the body attached to one of the end walls, the tab having at least one ridge with first and second ends and a top wall coplanar with the top wall of the chamber. The ridge is generally parallel to the longitudinal axis of the body, running substantially the length of the tab. The ridge merges with the top wall of the chamber at its first end and rises out of the plane of the tab and is sloped towards the top wall of the chamber at its second end. The closure plate closes the chamber at the bottom surface of the body, forming a holder that is resistant to folding perpendicular to its longitudinal axis such that the compact disc is less susceptible to theft and the ridge furthers proper placement of the holder in a display box.

The invention summarized above comprises the constructions hereinafter described, the scope of the invention being indicated by the subjoined claims.

BRIEF DESCRIPTION OF THE DRAWINGS

In the accompanying drawings, in which one various possible embodiments of the invention is illustrated, corresponding reference characters refer to corresponding parts throughout the several views of the drawings in which.

DETAILED DESCRIPTION OF THE INVENTION

Figure 2:
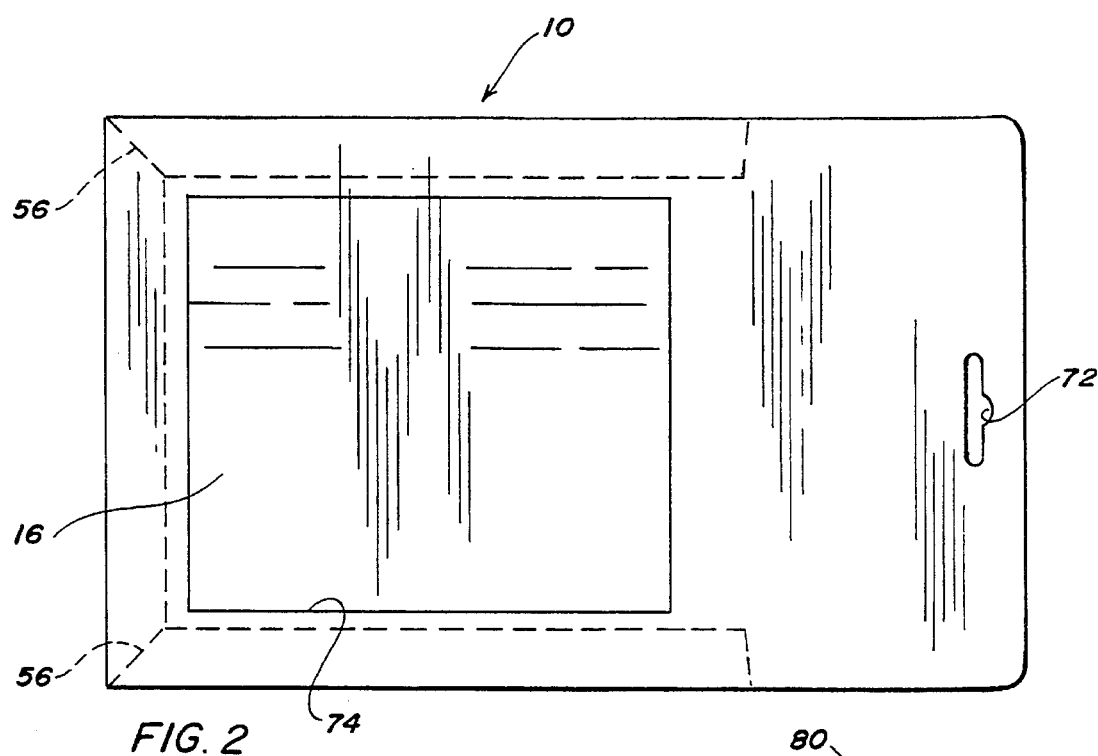
FIG. 2 is a bottom plan view of an assembled compact disc holder.

Referring to the drawings more particularly by reference character, reference numeral 10 refers to a compact disc holder in accordance with the present invention. Compact disc holder 10 holds a hinged storage box 12, commonly called a "jewel box" in which a compact disc is stored. Jewel box 12 is of a conventional type and has a booklet 14 (seen in FIG. 5) with album cover graphics on its front cover. Booklet 14 is held inside the front cover of jewel box 12 such that the front cover of the booklet is visible through the storage box. A wrapper 16 (seen in FIG. 2) with the program listing is also provided, visible through the rear cover of jewel box 12. Wrapper 16 is sandwiched between the rear cover and a disc holder which is snapped into the rear section of jewel box 12. Wrapper 16 extends around the ends of the disc holder to form panels 18 (seen in FIG. 5) that are imprinted with the title of the album, the name of the artist or the like such that this information can be read through the spine of the storage box.

Figure 1:
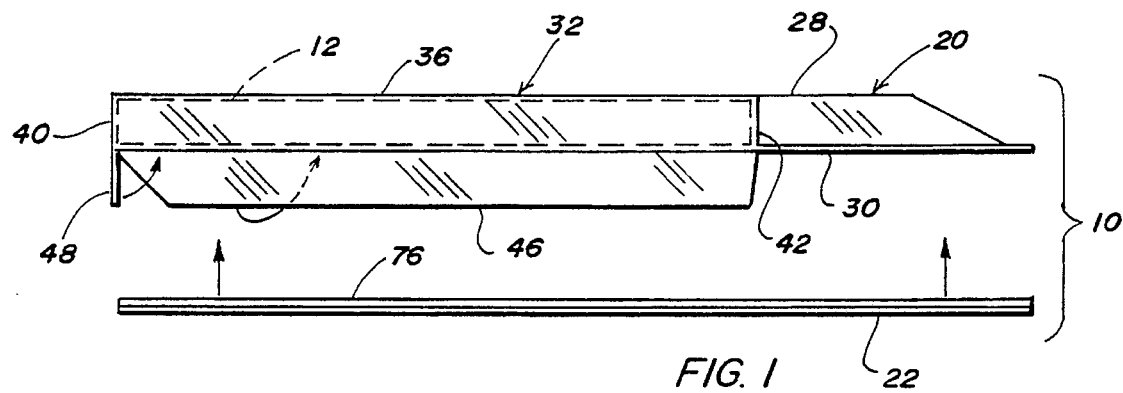
FIG. 1 is an exploded side elevational view of a compact disc holder including a body and closure plate in accordance with the present invention.
Figure 3:
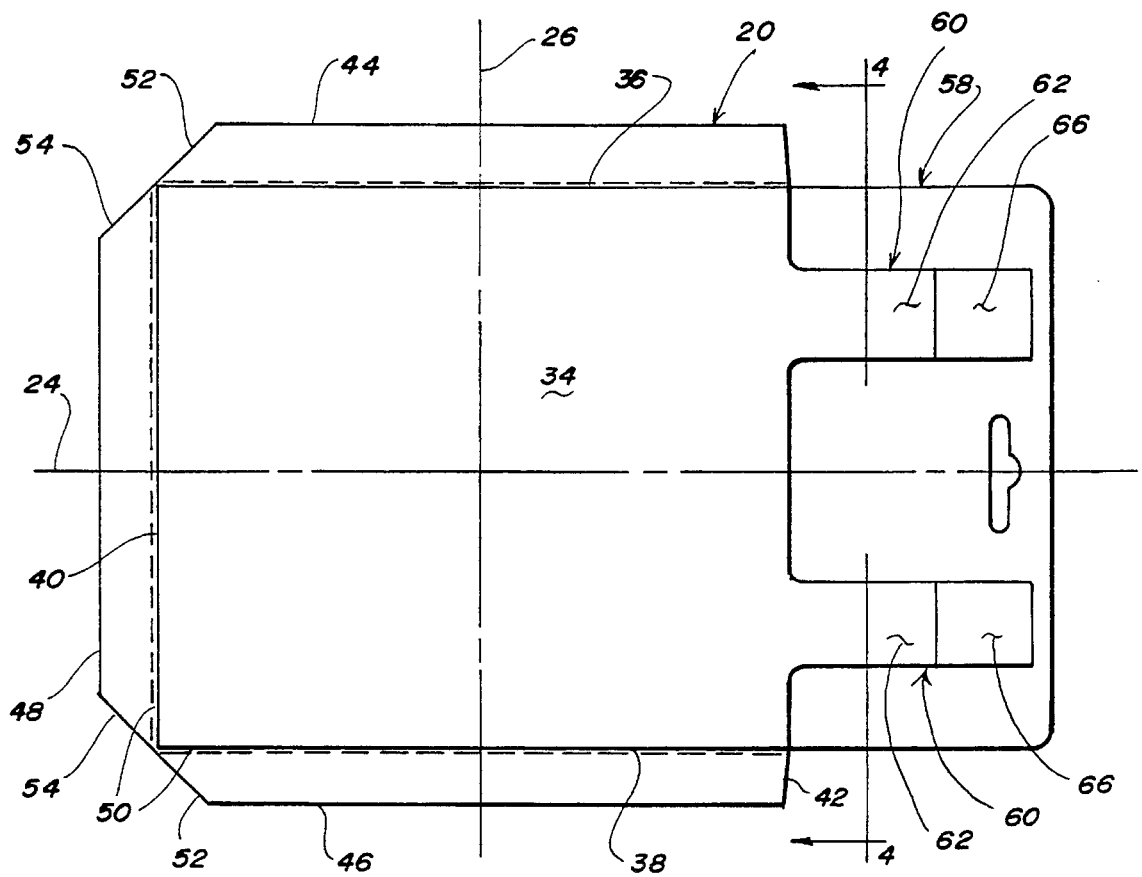
FIG. 3 is a top plan view of the body portion of the compact disc holder.
Figure 4:
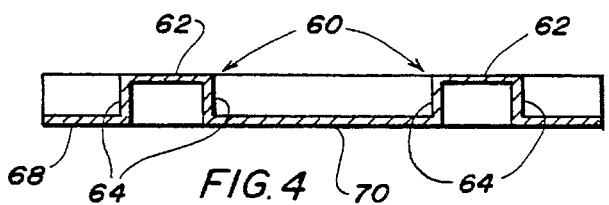
FIG. 4 is a section taken along line 4—4 in FIG. 3.

In major part, compact disc holder 10 has a unitary body 20 and a closure plate 22. Body 20 has a longitudinal axis 24, a lateral axis 26, a top surface 28 and a bottom surface 30. Bottom surface 30 preferably forms a generally rectangular footprint. As best seen in FIGS. 1 and 3, a generally square chamber 32 for jewel box 12 is formed at one end of body 20 with its longitudinal axis coinciding with longitudinal axis 24 of holder 10. Chamber 32 is sized to accept jewel box 12 and has a substantially planar top wall 34 joined at its edges by side walls 36, 38 and end walls 40, 42. Chamber 32 opens at bottom surface 30 along a bottom edge of the side and end walls.

Side walls 36, 38 and end wall 40 extend at substantially right angles to said planar top wall 34 whereas end wall 42 may flare outwardly as shown in U.S. Pat. No. 5,351,824. This slight taper (when present) makes the base of chamber 32 somewhat larger than the top of jewel box 12 and facilitates insertion of jewel box 12 into the holder. Right and left trapezoidal flaps 44, 46 are attached to side walls 36, 38 opposite top wall 34 and a third, trapezoidal flap 48 is attached to the bottom edge of end wall 40. A line of perforations 50 is formed at the base of flaps 44, 46 and 48 to facilitate folding as shown in FIG. 1. Non-parallel sides 52 of trapezoidal flaps 44, 46 and non-parallel sides 54 of third, trapezoidal flap 48 are sloped to form a mitered corner 56.

A substantially planar, rectangular tab 58 is formed in body 20 and is attached to chamber 32 along the bottom edge of end wall 42. Tab 58 has at least one ridge 60 generally parallel to longitudinal axis 24, rising out of the plane of tab 58 and angled towards the plane of top wall 34. In the form illustrated in FIGS. 1, and 3–5, a pair of parallel spaced apart ridges 60 are provided. Ridges 60 have a top wall 62 that is coplanar with top wall 34 of chamber 32 and side and end edges. The side edges of each ridge 60 are joined to side walls 64, which because jewel box 12 is thinner than a cassette box, need not flare outwardly with a reinforcing rib as in U.S. Pat. No. 5,351,824. Top wall 62 merges with top wall 34 of chamber 32 at one end of the ridge and joins at a dihedral angle with an end wall 66 at the other end. Ridges 60 are spaced inboard of the side edges of tab 58 such that tab 58 forms a flange 68 at the base of side walls 64 and end wall 66 and a web 70 interconnecting the base of the ridges. An aperture 72 is provided in tab 58 opposite chamber 32 to receive a retail display rod for use in one mode of retail display.

Closure plate 22 is provided for closing chamber 32 at bottom surface 30 of body 20. Closure plate 22 preferably conforms to the footprint of body 20 and includes a window 74 through which the program listing on wrapper 16 can be read. In the form shown in FIGS. 1 and 2, plate 22 is attached to body 20 along flange 68 across web 70, to folded flaps 44, 46 and 48 and, to a small section of jewel box 12 which is typically packaged in a clear plastic wrap. In other embodiments, for example, the frame around window 74 may be omitted at end flap 48 and end flap 48 elongated to cover the window.

While compact disc holder 10 is illustrated with chamber 32 sized for receipt of one jewel box 10, it will be understood that the chamber may have a depth for receipt of more than one jewel box. Similarly, the width or length of chamber 32 may be arranged such two or more jewel boxes are received side-by-side or end-to-end. Also included are other recording mediums, with the exception of cassette tapes which are the subject matter of U.S. Pat. No. 5,351, 824, the storage box for which may differ slightly in thickness and in width and length.

Body 20 is preferably thermoformed along with a plurality of other bodies from a sheet of clear plastic material or the like. The thermoforming process is well known in the art and basically involves vacuum-forming or molding a heated sheet of plastic material, into a mold, allowing it to set and then removing it from the mold. Suitable materials for this purpose include polyvinyl chloride having a thickness from about 8 to 15 mils and entirely satisfactory results have been obtained with sheets of polyvinyl chloride only 9 mils thick. Thicker material (i.e., greater than 15 mils) can be used but is more expensive and unnecessary. After the plastic has been removed from the mold, the outer edges of body 20 are trimmed and perforations 50 cut in a die-cutting operation, as is known in the art. Body 20 can then be nested with other bodies, such that a large number of bodies can be shipped and stored in relatively little space.

Closure plate 22 may be printed with an advertising message and is preferably die cut from a sheet of cardboard. For expediency, the message is generic to a group of compact discs (e.g., all those pre-priced at $9.99 and so forth) such that the plate does not have to be matched to a particular recording thus simplifying assembly of compact disc holder 10. An adhesive 76 is applied to closure plate 22 for attachment to body 20 as described above. Preferably the adhesive is of a type that is passive prior to sealing of compact disc holder 10 such that it can be applied to the sheet of cardboard before the plates are die cut and such that a stack of plates can be stored without sticking together. Such an adhesive advantageously comprises a dry film that is heat sealed to body 20 after jewel box 12 is put into chamber 32.

Figure 6:
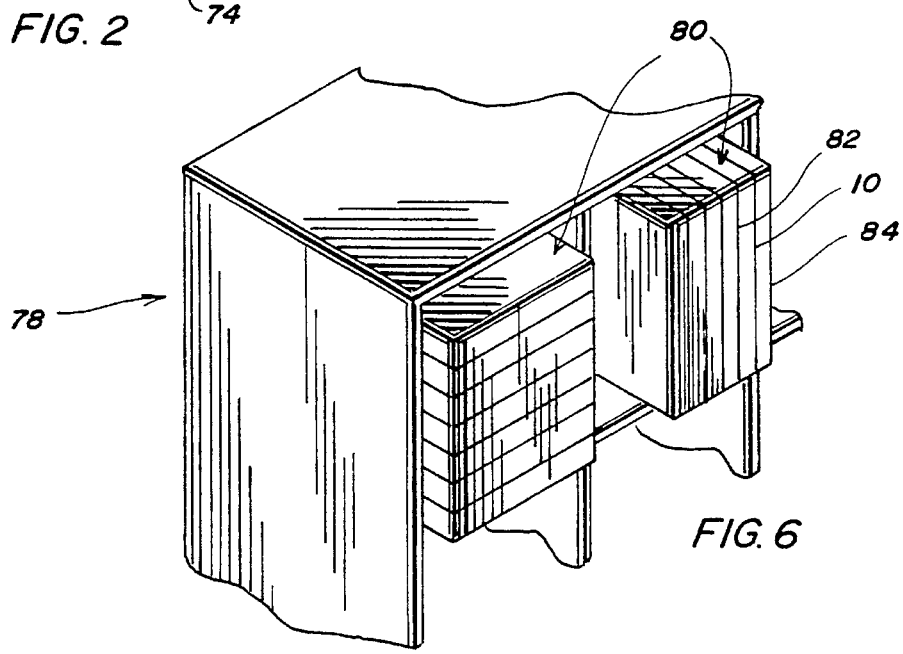
Figure 5:
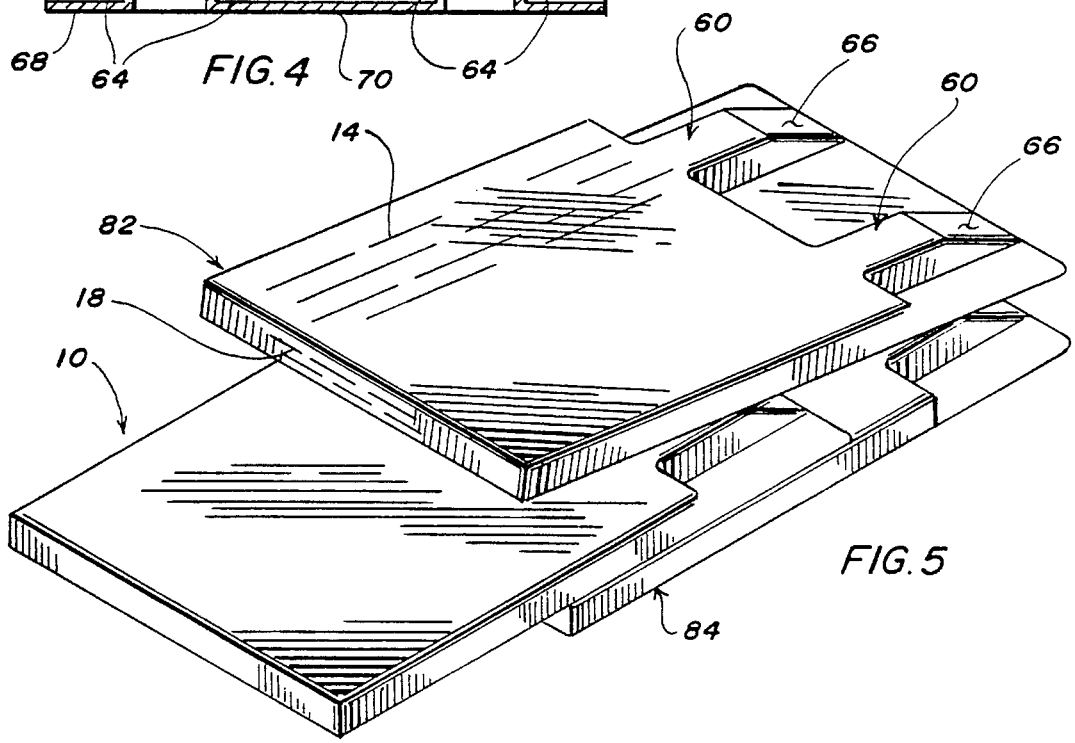
FIG. 5 is a perspective view of the compact disc holder being reshelved in a stack of similar compact disc holders; and, FIG. 6 is a storage box with a plurality of similar-sized pigeon holes and a mixed display of compact discs and cassettes with the discs in compact disc holders in accordance with the present invention and the cassettes in cassette box holders as described in U.S. Pat. No. 5,351,824.

In use, compact discs can be offered for sale in compact disc holder 10 either hung on a display rod or in a point of sale box or crate 78 which may be organized as illustrated in FIG. 6, preferably with a plurality of pigeon holes 80. When the compact discs are sold in a box, a shopper is more likely to put compact disc holder 10 back with side panel 18 facing outwardly. This is because compact disc holder 10 is weighted towards the disc end and a person tends to hold a package at its center of gravity, while the graphics on the front cover of booklet 14 favor holding it right side up. Starting from this natural position as shown in FIG. 5, sloped end wall 66 allows compact disc holder 10 to be easily slipped between similar upper and lower (or right and left) compact disc holders 82, 84. During reshelving, upper compact disc holder 82 cams up sloped end wall 66 and then slides along top wall 62 until the compact disc holder being inserted is stopped by the back wall for the display box at which point compact disc holders 10, 82 and 84 are lined up. Side panels 18 are visible and the display is neat.

A mixed inventory of compact discs and cassettes can be offered as shown in FIG. 6 by making pigeon holes 80 nominally the width of a cassette tape holder as described in U.S. Pat. No. 5,351,824 and the height of compact disc holder 10. Since compact disc holder 10 is wider than pigeon hole 80, the shape of the pigeon hole promotes reshelving of compact disc holders 10 vertically, whereas the shape of pigeon hole 80 also promotes reshelving of the cassette tape holders horizontally, keeping a mixed display neat. As shown in the drawings, each pigeon hole 80 contains 7 cassette tape holders stacked horizontally and 9 compact disc holders 10 arranged vertically. Other arrangements are of course possible and may, in some instances, be preferred.

In addition to favoring proper placement in a display, compact disc holder 10 is resistant to folding perpendicular to longitudinal axis 24 and jewel box 12 cannot be removed from the holder without mutilating the package. Compact disc holder 10 is less susceptible to theft because it is too big to be easily hidden in a pocket or purse and not easily opened without being detected. Product can therefore be offered for sale out of view of a store clerk and the display need not be near the checkout counter.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A compact disc holder for holding a jewel box containing a compact disc comprising a unitary body and a closure plate, said body having a longitudinal axis and a top surface and a bottom surface, a generally square chamber for a jewel box formed in said body having a substantially planar top wall joined at its edges by side and end walls, said chamber side and end walls opening on the bottom surface of the body, a substantially planar tab formed in said body attached to one of the end walls, said tab having at least one ridge with first and second ends and a top wall coplanar with the top wall of the chamber, said ridge generally parallel to the longitudinal axis of the body and running substantially the length of the tab, said ridge merging with the top wall of the chamber at its first end and rising out of the plane of the tab and sloped towards the top wall of the chamber at its second end;

said closure plate closing the chamber at the bottom surface of the body whereby the compact disc holder is resistant to folding perpendicular to its longitudinal axis such that the compact disc is less susceptible to theft and the ridge furthers proper placement of the compact disc holder in a display box.

2. The holder of claim 1 wherein a side flap is attached to each of the side walls of the chamber and an end flap is attached to the second of said end walls, said side and end flaps folded over the jewel box.

3. A compact disc holder for a jewel box containing a compact disc and a booklet visible through a front cover of the jewel box and a wrapper with a main panel visible through a rear cover of the jewel box, said wrapper having side panels attached to the main panel visible through a spine of the jewel box, said compact disc holder comprising a unitary body and a closure plate, said body formed of a transparent plastic material, having a longitudinal axis, a top surface and a bottom surface, a generally square chamber for a jewel box forming a first end of said body, said chamber having a substantially planar top wall joined at its edges to a top edge of side and end walls, said chamber opening on the bottom surface of the body along a bottom edge of the side and end walls, a substantially planar tab formed at a second end of said body and attached to the bottom edge of one of the end walls, said tab having a pair of spaced apart ridges generally parallel to the longitudinal axis of the body, said ridges having first and second ends and a top wall coplanar with the top wall of the chamber, said ridge merged with the top wall of the chamber at its first end and rising out of the plane of the tab and sloped towards the top wall of the chamber at its second end, a side flap attached to the bottom edge of each side wall and an end flap attached to the bottom edge of the other one of the end walls, said side and end flaps folded over the jewel box said closure plate having an aperture through which the main panel of the wrapper is generally visible, said closure plate adhesively secured to the bottom surface of the body whereby the compact disc holder is resistant to folding perpendicular to its longitudinal axis such that the compact disc is less susceptible to theft and the ridges further proper placement of the compact disc holder in a display box.

4. The holder of claim 3 wherein the tab forms a flange running along the sidewalls and sloped end walls of the ridges and a web between the ridges.

5. The holder of claim 4 wherein perforations are provided in the side and end flaps to facilitate folding.

6. The holder of claim 5 wherein the body is thermoformed from a sheet of polyvinyl chloride having a thickness from about 8 to 15 mil and wherein the closure plate has an adhesive layer that is thermosealed to the body along the flange, across the web, to the side and end flaps and to a portion of the jewel box adjacent the tab.

7. A holder for holding a storage box containing a recording media comprising a unitary body and a closure plate, said body having a longitudinal axis and a top surface and a bottom surface, a chamber conformed to the storage box formed in said body having a substantially planar top wall joined at its edges by side walls, said chamber side walls opening on the bottom surface of the body, a substantially planar tab formed in said body attached to one of the side walls of the chamber, said tab having at least one ridge with first and second ends and a top wall coplanar with the top wall of the chamber, said ridge generally parallel to the longitudinal axis of the body and running substantially the length of the tab, said ridge merging with the top wall of the chamber at its first end and rising out of the plane of the tab and sloped towards the top wall of the chamber at its second end;

said closure plate closing the chamber at the bottom surface of the body whereby the holder is resistant to folding perpendicular to its longitudinal axis such that the recording media is less susceptible to theft and the ridge furthers proper placement of the holder in a display box.

8. The holder of claim 1 wherein a side flap is attached to each of the side walls of the chamber other than the wall attached to the tab, said side flaps folded over the storage box.

* * * * *